2,742,347

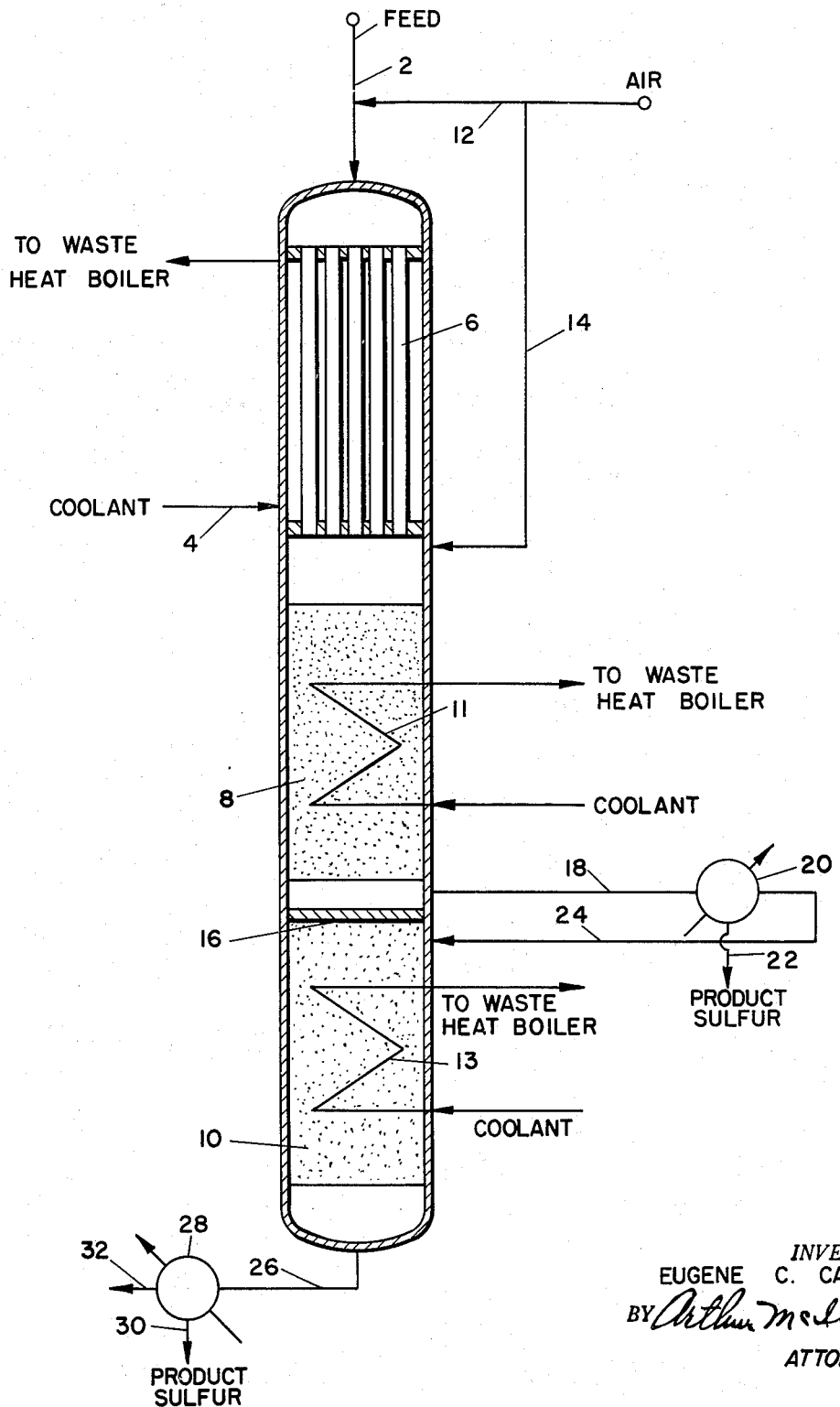

PRODUCTION OF SULFUR FROM GASEOUS MIXTURES CONTAINING HYDROGEN SULFIDE

Eugene C. Carlson, New York, N. Y., assignor to Stanolind Oil and Gas Company, Tulsa, Okla., a corporation of Delaware Application July 3, 1952, Serial No. 297,028

5 Claims. (Cl. 23—225)

The present invention relates to a novel method for the recovery of free sulfur from hydrogen sulfide-containing gases, and more particularly it relates to the recovery of sulfur from sour hydrocarbon gas streams.

Numerous methods have previously been devised for the removal of sulfur in elemental form from hydrocarbon or similar gases containing appreciable quantities of hydrogen sulfide. Various processes involving the direct oxidation of hydrogen sulfide to free sulfur have been proposed but have all seemed to suffer from the fact that the temperature of the reaction in commercial scale operations was extremely difficult to control. Processes now employed commercially for converting hydrogen sulfide into free sulfur, particularly the hydrogen sulfide present in various petroleum gases, are based on the following reactions:

$$2H_2S + 3O_2 \rightarrow 2SO_2 + 2H_2O \qquad (1)$$
$$SO_2 + 2H_2S \rightarrow 3S + 2H_2O \qquad (2)$$

In carrying out a process employing the above combination of reactions, one-third of the hydrogen sulfide is diverted to a furnace where it is mixed with air under conditions such that sulfur dioxide and water are the principal products in accordance with Reaction 1. The furnace combustion products are then combined with the remaining two thirds of the hydrogen sulfide and conducted into a separate converter of considerable size where reaction occurs in accordance with Equation 2.

However, with procedures involving the above-mentioned reactions using sour natural gas or equivalent feed, either an acid gas separation system must be employed to remove the hydrogen sulfide from one-third of the original stream and converting the hydrogen sulfide thus separated into sulfur dioxide for subsequent reaction in a known manner with the hydrogen sulfide in the remaining two-thirds of the stream, or one-third of the original feed stream may be diverted into a furnace and the hydrogen sulfide burned to sulfur dioxide in which case the hydrocarbons, if present, are completely destroyed. Other procedures involve generation of the necessary sulfur dioxide by burning a portion of the product sulfur. The resulting sulfur dioxide is then combined with the hydrogen sulfide in the initial stream and this mixture reacted over bauxite or equivalent catalyst to produce free sulfur. Thus, in the case of the first-mentioned procedure, a rather expensive and complex separation system must be employed to recover the hydrogen sulfide from the diverted portion of the original stream if it is desired to conserve the hydrocarbons present in that portion. In the second procedure discussed, there are several disadvantages in addition to the destruction of the hydrocarbons. The air requirement for the plant and the heat release would be greatly increased which would result in additional investment and operating costs for the air compressor and the boiler. Also, the dilution of the effluent gases with the products of combustion and the nitrogen associated with the air required to oxidize the hydrocarbons would require considerably larger sulfur recovery facilities.

Accordingly, it is an object of my invention to provide a process for the recovery of sulfur from sour hydrocarbon-containing gases by means of a procedure whereby none of the hydrocarbon component of the feed stream is lost and the use of a complicated gas separation system is avoided. It is a further object of my invention to provide a method whereby hydrogen sulfide present in gaseous hydrocarbons can be converted into sulfur dioxide and free sulfur without combustion of the hydrocarbons.

In carrying out my invention the sour hydrocarbon gas containing at least about 50 volume per cent hydrogen sulfide and preferably from about 60 to 80 volume per cent hydrogen sulfide is mixed with air in an amount such that under the conditions of the reaction, preferably not more than about 75 volume per cent of the theoretical oxygen required for the reaction $H_2S + \frac{1}{2}O_2 \rightarrow S + H_2O$ will be converted in the first oxidation step. In accomplishing the latter, the sour gas is mixed with not more than about 75 per cent of the theoretical air and introduced into a suitable heat exchanger where oxidation of some of the hydrogen sulfide to sulfur dioxide is effected. I have found that this reaction can be very noticeably promoted by employing a heat exchanger having an interior surface composed of any of the stainless steels, carbon or mild steel, an iron impregnated aluminum surface, or equivalent materials. In this connection, it is to be specifically understood that the term "ferrous metal" as used in certain of the appended claims is to be construed to include the various types of metal surfaces just enumerated. Under the conditions provided, a portion of the hydrogen sulfide is completely oxidized to sulfur dioxide, a portion of which reacts in turn with unconverted hydrogen sulfide to form free sulfur and water vapor.

The temperature of the initial oxidation is held generally between about 600° and 750° F. The products thus obtained are mixed with the remainder of the air required (if all is not added initially), thus reducing the temperature to a value of from about 550° F. down to a temperature slightly above the dew point of sulfur. These gases are then sent to a reaction zone filled with a catalyst bed in which the latter has been diluted in stages with an inert material, preferably as described in copending application, U. S. Serial No. 294,492, filed June 19, 1952, by Frank G. Pearce et al. In accordance with the method there described, the temperature of the catalyst bed is maintained above about 400° F. but below about 1200° F. by varying the concentration of diluent or inert material from a high percentage at the inlet end of the bed to a low percentage toward the exit end thereof until a zone is reached in the bed adjacent the outlet which is substantially pure catalyst. Also, if desired, the bed may consist of alternate sections of diluent and catalyst with the ratio of diluent depth to catalyst depth progressively decreasing from the influent to the effluent end of the bed.

The catalyst used in the above-mentioned bed is preferably bauxite but, if desired, may be any of a number of other catalysts suitable for the partial oxidation of hydrogen sulfide such as, for example, silica containing small amounts of aluminum oxide, boric anhydride, and sodium or potassium oxides. The diluent may be aluminum pellets or particles, alloys of high aluminum content, bauxite catalyst which has become inactive, quartz, or the like.

In the above-mentioned diluted bed a substantial portion of the hydrogen sulfide is oxidized to free sulfur. The resulting products of reaction, which are in a vaporous or gaseous condition, are withdrawn from the aforesaid stage diluted bed and cooled. In this manner, the product sulfur is separated from the gaseous materials such as sulfur dioxide, unconverted hydrogen sulfide, gaseous hydrocarbons, etc. The uncondensed portion of the stream resulting from the sulfur condensation step is then reheated and sent to a conventional Claus type converter filled, for example, with an undiluted bed or bauxite catalyst where the sulfur dioxide and hydrogen sulfide react to form additional free sulfur. The gaseous reaction products thus obtained are then sent to a suitable condensing system where product sulfur is removed in liquid form. The uncondensed phase at this stage of the process consists essentially of gaseous hydrocarbons which, if desired, without further purification may be employed as fuel gas.

My invention may be further illustrated by the accompanying drawing which is a diagrammatic representation of a particular embodiment thereof in which a rich hydrogen sulfide-containing gaseous hydrocarbon stream is introduced through line 2 into an elongated shell 4 having installed therein a suitable heat exchanger 6, a diluted catalyst bed 8, and an undiluted catalyst bed 10 equipped with heat exchangers 11 and 13, respectively. Air is added through line 12 to the hydrogen sulfide-containing gaseous mixture prior to introduction of the latter into the top of shell 4. Generally, the quantity of air introduced into the system at this point should be at least about 75 per cent of the total required. In heat exchanger 6, operated at a temperature of from about 600° to 750° F., a position of the hydrogen sulfide present may be oxidized to sulfur dioxide which, in turn, reacts with unconverted hydrogen sulfide to produce free sulfur. The production of sulfur dioxide under these conditions is noticeably promoted by employing heat exchanger tubes, the interior surface of which are of stainless or carbon steel or aluminum impregnated with iron. Surfaces of the latter type may be prepared by etching the interior of the aluminum tubes with caustic and activating the resulting etched surface with a soluble iron salt, or the iron may, if desired, be electrodeposited thereon. The air added to the system through line 2 may be the entire quantity required, or it may consist of at least about 75 per cent of the necessary amount. In general, however, it is usually preferable to split the air stream and introduce the remainder into the system through line 14 at a point between exchanger 6 and catalyst bed 8. In this manner, the temperature of the gases entering catalyst bed 8 may be cooled from a temperature slightly above the dew point of sulfur under the existing conditions to about 550° F., thus providing for better and more uniform temperature control of the reaction occurring in catalyst bed 8. As previously indicated, the top temperature in catalyst bed 8 should not be appreciably above about 1200° F. and preferably should generally not be in excess of about 1000° F. The product gases from the aforesaid bed are blocked from further downward flow by means of a barrier 16 and are forced through line 18 and condenser 20 where liquid sulfur is separated at a temperature of about 275° to 350° F. and withdrawn from the system through line 22. The uncondensed gases containing sulfur dioxide, unconverted hydrogen sulfide, hydrocarbons, etc., are returned to elongated shell 4 via line 24 and introduced into catalyst bed 10 which is maintained at a temperature ranging from about 550° to 650° F. In this bed a substantially complete clean up of gaseous sulfur compounds is effected by converting these compounds to free sulfur. The gaseous products of reaction are withdrawn through line 26, sent to condenser 28 where product sulfur is withdrawn in liquid form through line 30 at a temperature between about 275° and 350° F. The gas withdrawn through line 32 consists chiefly of hydrocarbons and nitrogen.

Operating in the manner outlined above, it is possible to achieve hydrogen sulfide conversions of about 80 per cent (once-through basis) with a selectivity to free sulfur of about 87 percent. In addition, I have found that with heat exchangers constructed of carbon steel tubing and using as feed gases containing 60 volume per cent hydrogen sulfide, about 12 per cent of the hydrogen sulfide was converted therein with about 50 per cent of the converted hydrogen sulfide going to free sulfur and the other half to sulfur dioxide. With the same feed gases and heat exchangers employing stainless steel tubes, as much as about 46 per cent of the hydrogen sulfide present in the introduced gaseous mixture was converted, approximately 87 per cent thereof being free sulfur. Such results constitute clear evidence that it is possible to effect the preheating of the mixed gases in accordance with my invention and that the reaction to produce sulfur dioxide can be effected at temperatures far below the flame temperatures of the hydrogen sulfide burner installations normally used in conventional procedures for recovering sulfur from hydrogen sulfide-containing gases. Also, it is to be pointed out that while the quantity of sulfur dioxide produced under the conditions of my process may appear to be relatively small, the sulfur dioxide ultimately withdrawn from the heat exchanger represents only a portion of that actually produced, since a substantial part of the sulfur dioxide thus formed reacts immediately with the unconverted hydrogen sulfide present to produce free sulfur.

Alternatively, in place of the design shown employing stage diluted catalyst bed 8 and catalyst bed 10, I may utilize undiluted catalyst beds having heat exchangers spaced therebetween with means for introducing a portion of the required air into the system both above and immediately below the first catalyst bed so that the effluent gases therefrom may be thoroughly mixed with the remainder of the required air as shown in the design described and claimed in copending application, U. S. Serial No. 250,908, filed October 11, 1951, by Frank G. Pearce. In that particular design, the gaseous reaction mixture from the last catalyst bed is cooled to a temperature of about 475° F. by means of a suitable heat exchanger. The product gases are thereafter brought into contact with a condenser to yield liquid sulfur at a temperature of about 275° F., which is withdrawn and sent to a suitable receiving unit.

I claim:

1. In a process for recovering elemental sulfur from a gaseous stream containing at least 50 volume per cent hydrogen sulfide involving oxidation of said hydrogen sulfide to free sulfur, the steps which comprise adding to said stream not more than about 75 volume per cent of the oxygen required to oxidize said hydrogen sulfide to free sulfur, introducing the resulting mixture into a hollow reaction zone, the interior surface of which consists essentially of a catalytic ferrous metal to partially convert said hydrogen sulfide into sulfur and sulfur dioxide at a temperature ranging from about 600° to 750° F., withdrawing gaseous products from said zone and mixing the remainder of the required amount of air with said products, thereafter contacting the resulting mixture with a fixed bed of catalyst for said oxidation maintained at a temperature of from about 400° to about 1200° F. wherein said catalyst is mixed with particles substantially inert under the conditions of the involved oxidation, the concentration of said inert material in the catalyst bed decreasing progressively with the flow of hydrogen sulfide, thereafter cooling the resulting sulfur-containing vapors, and separating liquid sulfur therefrom.

2. In a process for recovering elemental sulfur from a gaseous stream containing at least 50 volume per cent hydrogen sulfide involving the partial oxidation of said hydrogen sulfide to free sulfur, the steps which comprise adding to said stream not more than about 75 volume per cent of the oxygen required to oxidize said hydrogen sulfide to free sulfur, introducing the resulting mixture into a hollow reaction zone, the interior surface of which consists essentially of a catalytic ferrous metal to partially convert said hydrogen sulfide into free sulfur at a temperature ranging from about 600° to about 750° F., withdrawing a mixture of hot gaseous products and unconverted hydrogen sulfide from said zone and adding to said mixture the remainder of the required amount of air for the conversion of said unconverted hydrogen sulfide into free sulfur whereby the temperature of the resulting mixture is reduced to a value of from slightly above the dewpoint of sulfur to about 550° F., next contacting the resulting mixture with a fixed bed of catalyst for said oxidation maintained at a temperature of from about 400° to about 1200° F., thereafter cooling the resulting sulfur-containing vapors, and separating liquid sulfur therefrom.

3. The process of claim 2 in which the interior surface of said reaction zone consists essentially of stainless steel.

4. The process of claim 2 in which the interior surface of said reaction zone consists essentially of carbon steel.

5. The process of claim 2 in which the interior surface of said reaction zone consists essentially of an iron impregnated aluminum surface.

References Cited in the file of this patent

UNITED STATES PATENTS

| | | |
|---|---|---|
| 1,452,145 | Cederberg | Apr. 17, 1923 |
| 1,984,971 | Herold et al. | Dec. 18, 1934 |
| 2,200,529 | Baehr et al. | May 14, 1940 |
| 2,298,641 | Schulze et al. | Oct. 13, 1942 |
| 2,393,240 | Dreyfus | Jan. 22, 1946 |
| 2,581,135 | Odell | Jan. 1, 1952 |

FOREIGN PATENTS

| | | |
|---|---|---|
| 319,396 | Great Britain | Sept. 20, 1946 |
| 623,264 | Great Britain | May 16, 1949 |